June 3, 1947.  B. F. SCRIBNER  2,421,467

METHOD FOR DETERMINATION OF GRAPHITIC CARBON

Filed Feb. 4, 1944

*INVENTOR.*
BENJAMIN F. SCRIBNER
BY
George R. Ericson
ATTORNEY a Patented June 3, 1947

2,421,467

UNITED STATES PATENT OFFICE 2,421,467

METHOD FOR DETERMINATION OF GRAPHITIC CARBON

Benjamin F. Scribner, Berkeley, Calif.

Application February 4, 1944, Serial No. 521,154

2 Claims. (Cl. 23—230)

This invention relates to a method of determination of graphitic carbon and other chemicals requiring similar treatment.

The determination of graphitic carbon in cast iron is based upon the assumption that the combined carbon dissolves in dilute nitric or hydrochloric acid and the graphitic carbon does not. The latter is filtered, washed, dried and ignited in an atmosphere of oxygen. The carbon dioxide formed is caught in an absorption bulb and weighed.

The usual practice is to filter the sample through a Gooch crucible on an asbestos mat, and after drying, transfer the mat and residue to a combustion boat and ignite as in the determination of total carbon. This has the disadvantage that there is always likelihood of loss during the transfer. An alternate method is to filter through a porous bottomed crucible on an asbestos mat, the crucible being of such a size as to fit into the combustion tube. The crucible is dried and inserted into the tube for ignition. This has the disadvantage that all of the carbon dioxide formed must pass through the mat of asbestos in order to be absorbed. This is a time consuming operation.

In order to avoid the delays and inaccuracies of previous methods I have developed a combination filter and combustion boat in which the bottom of the filter may be turned as a valve and closed for the filtration of the asbestos mat and the precipitate; or, alternatively, opened to permit the rapid flow of oxygen over the precipitate during combustion.

The invention will be better understood upon reference to the following specification and accompanying drawings, referring to which:

Figure 2:
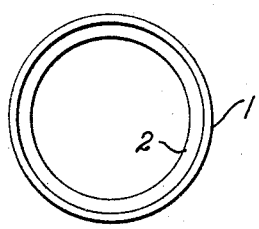
Figure 2 is an end view of the filter with the strainer removed.

The reference numeral 1 indicates a tubular casing formed of nickel or other refractory and inert material. This casing has a flange 2 serving as a seat upon which rests the strainer 3, which is perforated as shown.

Initially the casing 1 is placed so that its axis is vertical, and that the plane of the strainer 3, seated on the flange 2 of the casing is horizontal.

In order to carry out the method a filter bed 4 is formed by depositing asbestos from a flocculent solution. This may be done by gravity or by use of a suction tube, if desired. After the asbestos bed has been deposited, the filter and combustion boat are dried and the solution containing graphitic carbon is filtered in order to deposit the precipitate 5 on the filter bed. It will be understood that some of the precipitate may be deposited on the walls of 1, as indicated at 6, but adhesion of these particles is of no importance with this apparatus because it is eventually burned.

Figure 5:
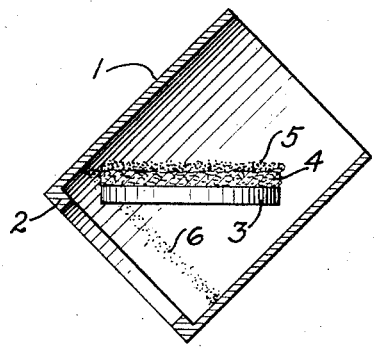
Figure 5 is a sectional view showing the manner in which the filter is tipped sidewise in turning the combustion boat casing to horizontal position.
Figure 1:
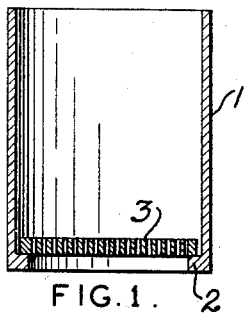
Figure 1 is a vertical, sectional view of the combined filter and combustion boat.
Figure 6:
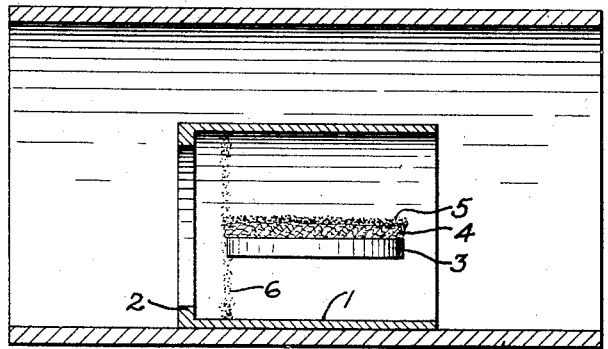
Figure 6 shows the filter and combustion boat within the combustion tube.
Figure 3:
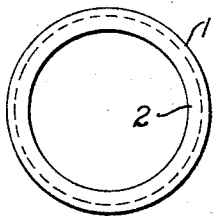
Figure 3 is an end view of the opposite end of the device shown in Figure 2.
Figure 4:
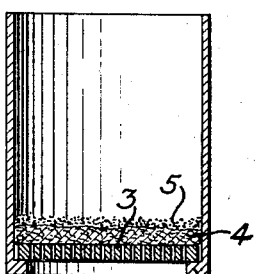
Figure 4 is a vertical sectional view showing the combined filter and combustion boat after depositing the asbestos filter bed and the precipitate, which is to be determined.
Figure 7:
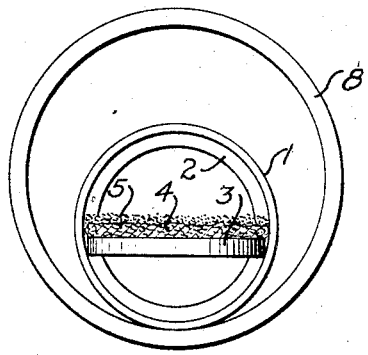
Figure 7 is an end view of the device shown in Fig. 6.

In order to avoid spilling any of the precipitate the strainer 3 is manually maintained in a horizontal position while casing 1 is tipped, first at an angle, as shown in Fig. 5, then horizontally, as shown in Fig. 6. In this position the walls of the casing 1 support the strainer in horizontal position, so as to present no substantial resistance to the flow of oxygen through the combustion tube.

The means for supplying oxygen and collecting the by-products of combustion are not shown, as these are well known in the art, but it will be understood that the combustion tube 8 is heated to a high temperature by any suitable means and the oxygen is passed over the precipitate, as indicated by the arrow in Fig. 6.

I claim:

1. The method of determining graphitic carbon which comprises depositing an asbestos filter bed upon a strainer which is loosely seated in a horizontal position against a shoulder in a tubular casing vertically positioned, said strainer being of slightly less diameter than the interior of said casing, whereby the asbestos filter bed permits the flow of liquid from the casing but completely seals the casing against the flow of solid matter carried by unfiltered liquid, depositing the material containing graphitic carbon upon said filter bed by filtration, retaining said filter bed in horizontal position so that the axis of said casing passes through the plane of said filter bed, turning said casing to a horizontal position, and flowing a gaseous re-agent through the casing under high temperature conditions.

2. The method of determining graphitic carbon which comprises placing a comparatively coarse strainer member horizontally in a tubular casing vertically positioned, said strainer member being of slightly less diameter than the interior of said casing, depositing a filter bed on and around said strainer, turning the axis of the casing to a horizontal position and retaining the plane of the filter bed in a horizontal position so that the axis of said casing passes through the plane of said filter bed, heating the casing and filter bed, and passing oxygen over the filter bed and through the casing at high temperature, whereby particles of carbon adhering to the walls of the casing and to the filter bed may be subjected to the reaction.

B. FRANK SCRIBNER.

REFERENCES CITED

The following references are of record in the file of this patent:

UNITED STATES PATENTS

| Number | Name | Date |
| --- | --- | --- |
| 773,529 | Seward | Oct. 25, 1904 |
| 1,382,072 | Finkl | June 21, 1921 |
| 1,769,841 | Jones | July 1, 1930 |

OTHER REFERENCES

Scott, Standard Methods of Chem. Anal., 2d ed. (1920), pages 99 and 100.